Figure 1:
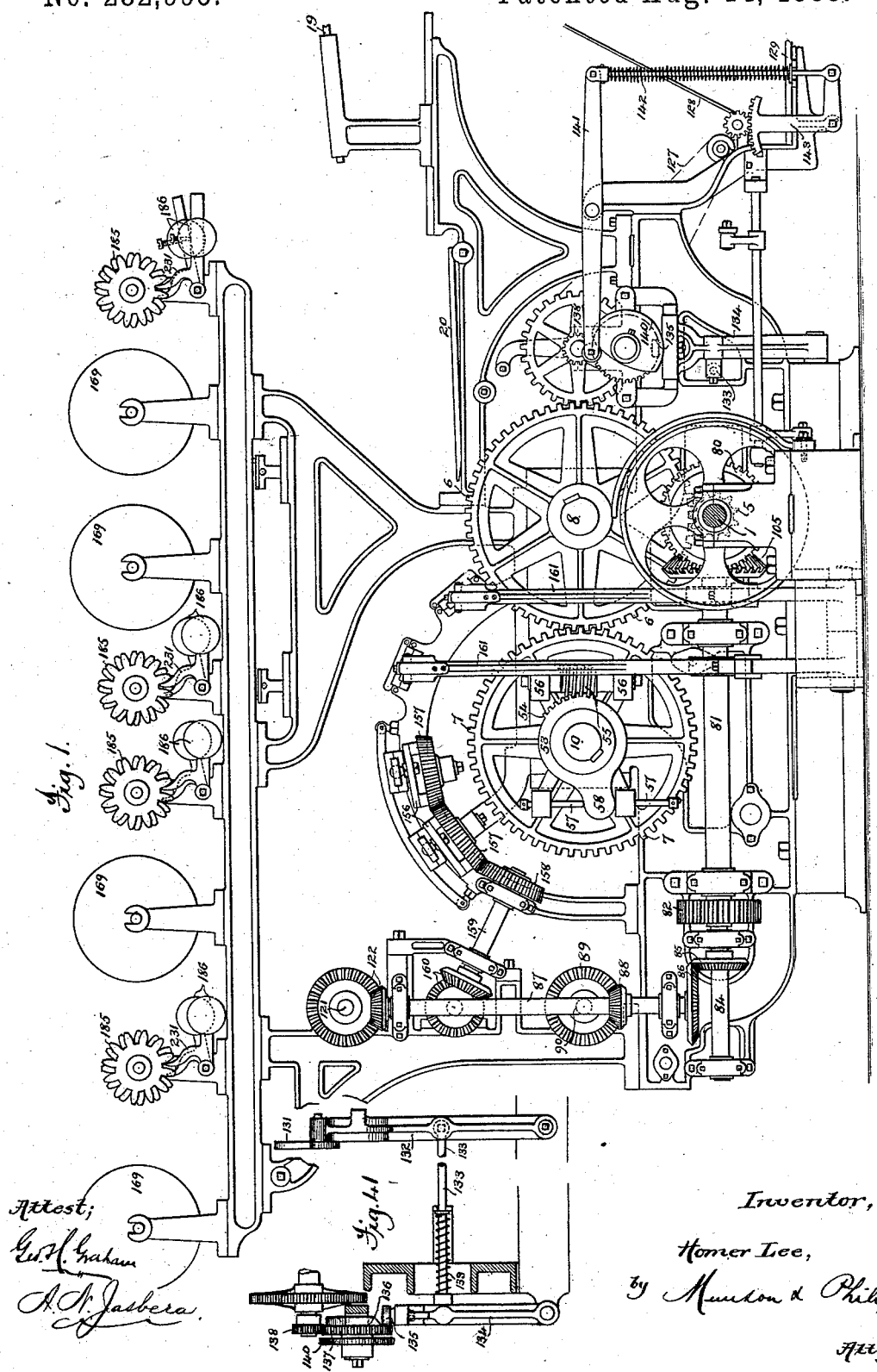

(No Model.) 12 Sheets—Sheet 1.
H. LEE.
PLATE PRINTING MACHINE.

No. 282,995. Patented Aug. 14, 1883.

Fig. 1¹

Attest:
Geo. H. Graham
A. N. Jasbera

Inventor,
Homer Lee,
by Munson & Philipp
Att'ys.

(No Model.)
12 Sheets—Sheet 4.

H. LEE.
PLATE PRINTING MACHINE.

No. 282,995. Patented Aug. 14, 1883.

Attest:
Geo. H. Graham
H. N. Jasbera

Inventor,
Homer Lee,
by Munson & Philipp
Attys.

N. PETERS. Photo-Lithographer, Washington, D. C.

(No Model.)       12 Sheets—Sheet 5.

H. LEE.
PLATE PRINTING MACHINE.

No. 282,995.                Patented Aug. 14, 1883.

Attest:
Geo. H. Graham
A. N. Jasbera

Inventor,
Homer Lee,
by Munson & Philipp
Att'ys.

(No Model.) 12 Sheets—Sheet 6.
H. LEE.
PLATE PRINTING MACHINE.
No. 282,995. Patented Aug. 14, 1883.

Attest:
Geo. H. Graham
A. N. Jasbera

Inventor,
Homer Lee,
by Munson & Philipp
Attys.

(No Model.) 12 Sheets—Sheet 7.
H. LEE.
PLATE PRINTING MACHINE.
No. 282,995. Patented Aug. 14, 1883.
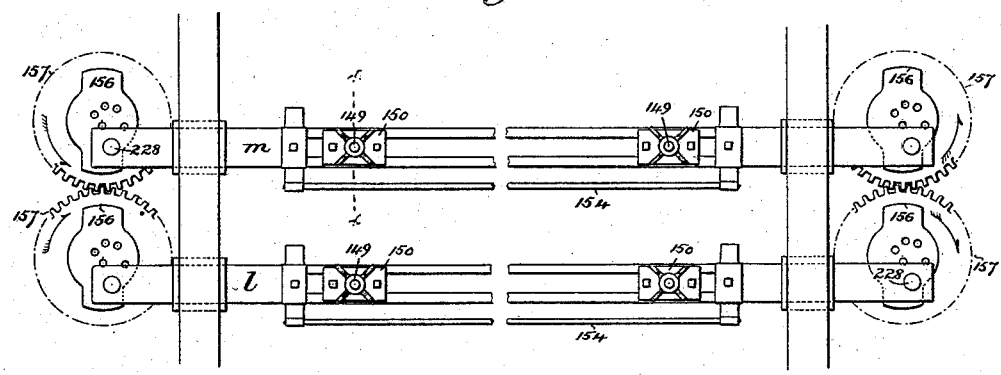
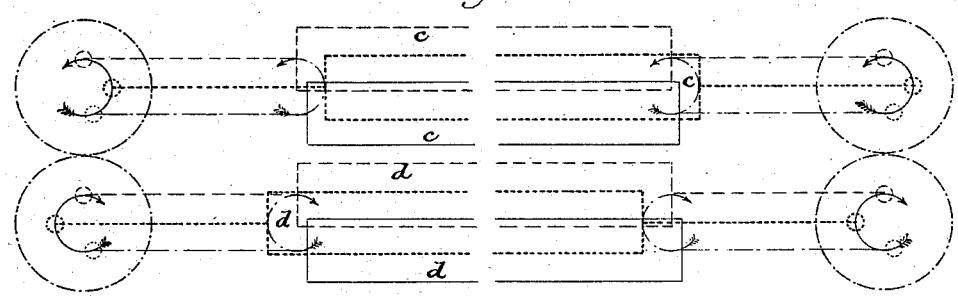
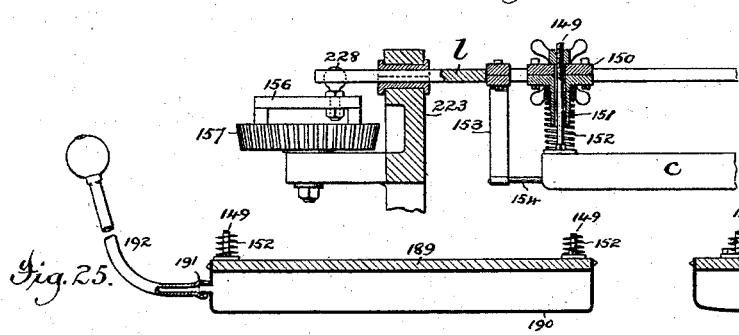
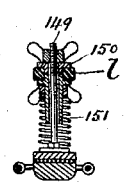
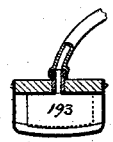
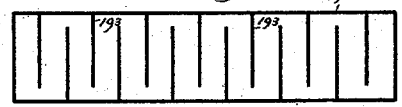
Attest;
Geo. H. Graham
A. N. Jasbera
Inventor,
Homer Lee,
by Munson & Philipp
Attys.
N. PETERS, Photo-Lithographer, Washington, D. C.

(No Model.) 12 Sheets—Sheet 8.
H. LEE.
PLATE PRINTING MACHINE.

No. 282,995. Patented Aug. 14, 1883.

Attest:
A. N. Jasbera
T. H. Palmer

Inventor:
Homer Lee,
by Munson & Philipp
Attys.

(No Model.) 12 Sheets—Sheet 9.

H. LEE.
PLATE PRINTING MACHINE.

No. 282,995. Patented Aug. 14, 1883.

Attest:
Geo. H. Graham
A. N. Jasbera

Inventor,
Homer Lee,
by Munson & Philipp
Attys.

(No Model.)  
12 Sheets—Sheet 10.
H. LEE.
PLATE PRINTING MACHINE.
No. 282,995. Patented Aug. 14, 1883.
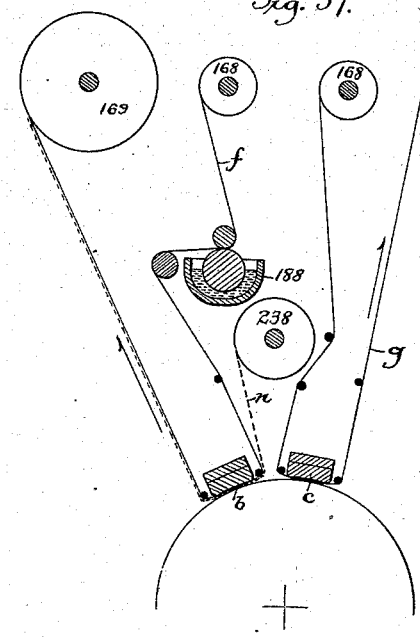
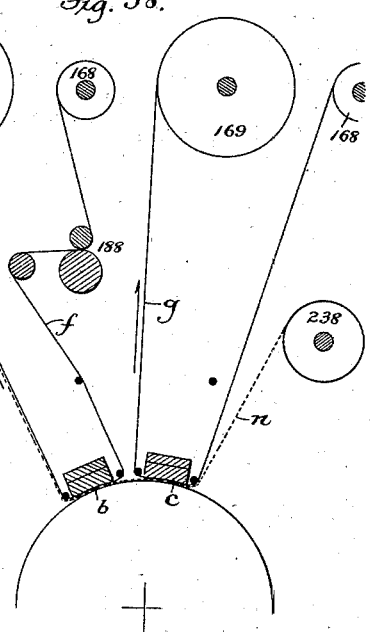
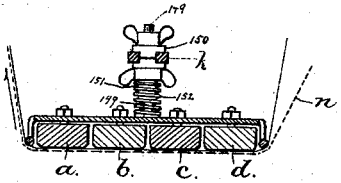
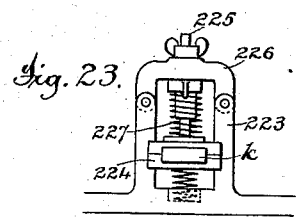
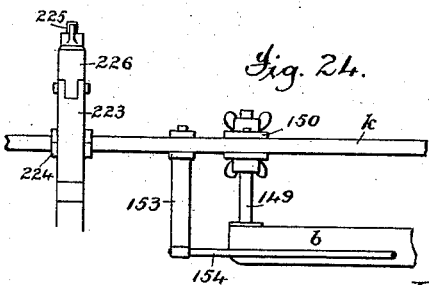
Attest:  
A. N. Jasbera  
T. H. Palmer
Inventor:  
Homer Lee,  
by Munson & Philipp  
Attys.

(No Model.)         H. LEE.         12 Sheets—Sheet 11.
PLATE PRINTING MACHINE.
No. 282,995.         Patented Aug. 14, 1883.
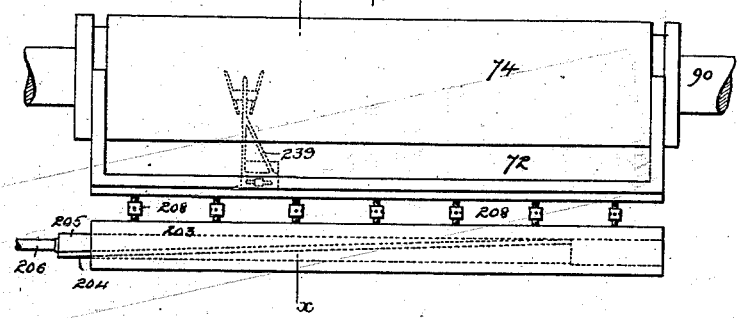
FIG. 29.
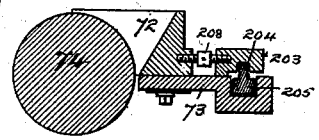
FIG. 30.
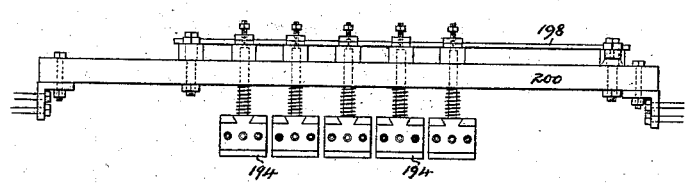
FIG. 31.
FIG. 32.
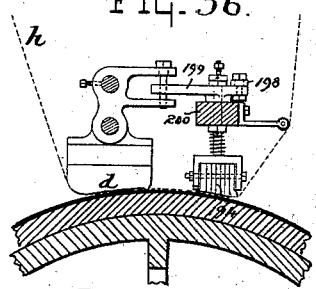
FIG. 36.
FIG. 40.
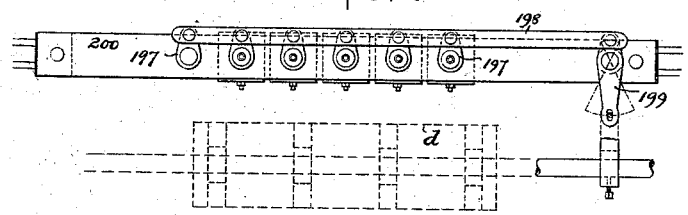
FIG. 33.  FIG. 34.
FIG. 35.
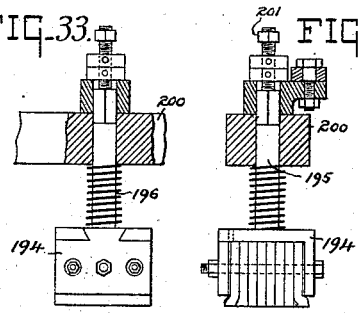
WITNESSES:
G. W. H. Graham
A. N. Jasbera
INVENTOR:
Homer Lee,
by Munson & Philipp
Attys.

(No Model.)

12 Sheets—Sheet 12.

H. LEE.
PLATE PRINTING MACHINE.

No. 282,995. Patented Aug. 14, 1883.

Attest;
Geo. H. Graham
A. N. Jasbera.

Inventor,
Homer Lee,
by Munson & Philipp
Att'ys.

N. PETERS. Photo-Lithographer, Washington, D. C.

UNITED STATES PATENT OFFICE.

HOMER LEE, OF NEW YORK, N. Y.

PLATE-PRINTING MACHINE.

SPECIFICATION forming part of Letters Patent No. 282,995, dated August 14, 1883.

Application filed February 3, 1883. (No model.)

*To all whom it may concern:*

Be it known that I, HOMER LEE, a citizen of the United States, residing in the city of New York, county of New York, and State of New York, have invented certain new and useful Improvements in Plate-Printing Mechanism, fully described and represented in the following specification and the accompanying drawings forming a part of the same.

The present invention relates to a mechanism designed for use in plate-printing, and particularly to a mechanism of that class in which the printing is accomplished by rotary devices, and the various operations involved in the heating, moving, inking, wiping, and polishing of the plates are accomplished automatically.

In United States Letters Patent No. 210,116, reissued July 20, 1880, No. 9,317, there is described a mechanism of this general character; and it is the object of the present invention to effect certain improvements in the mechanism therein shown, whereby it will be made to operate more successfully and to accomplish more satisfactory results.

To that end the invention consists in various details of construction and combinations of parts in the various mechanisms for performing the different operations, all of which will be hereinafter fully explained, and particularly pointed out.

Figure 2:
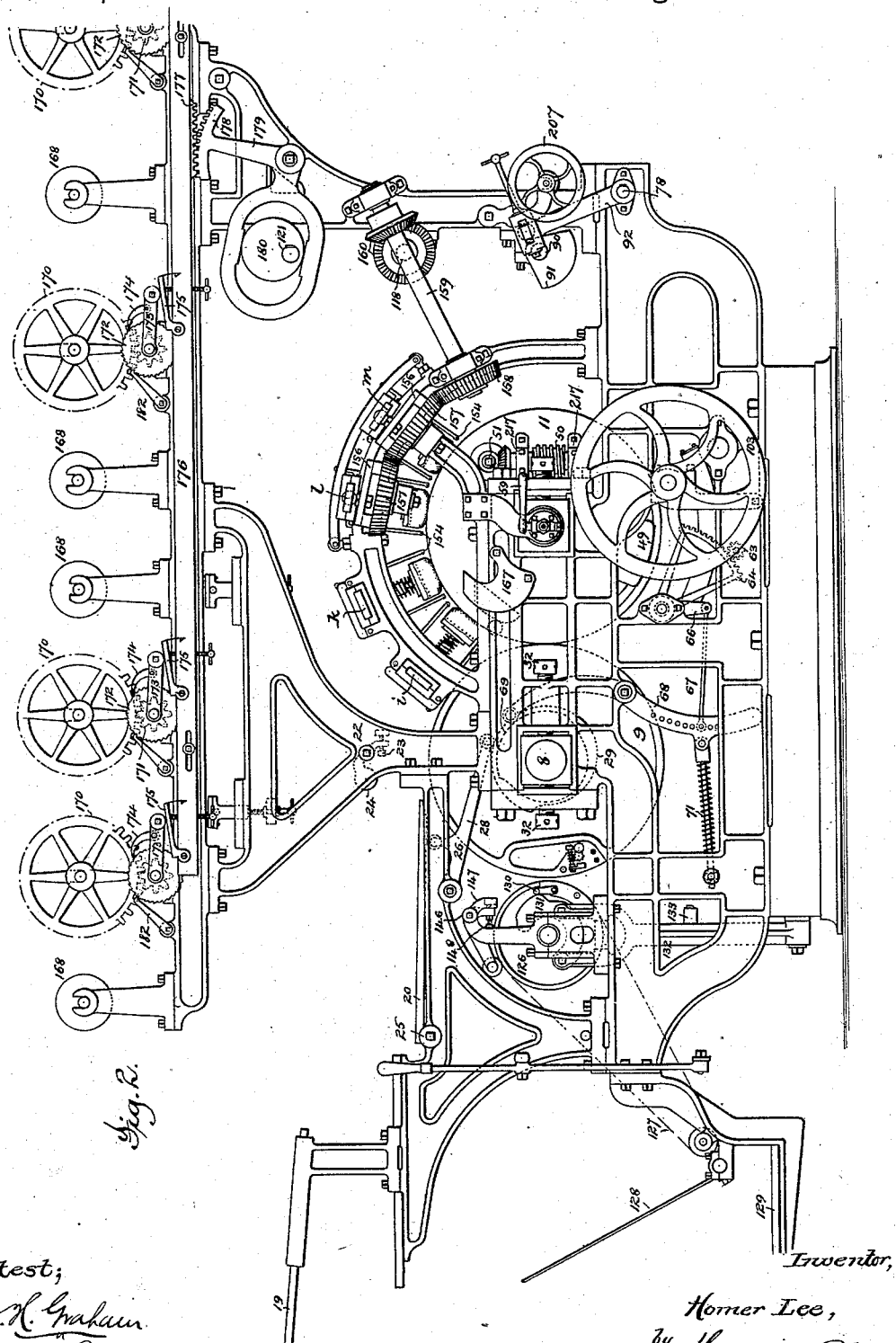
Figure 3:
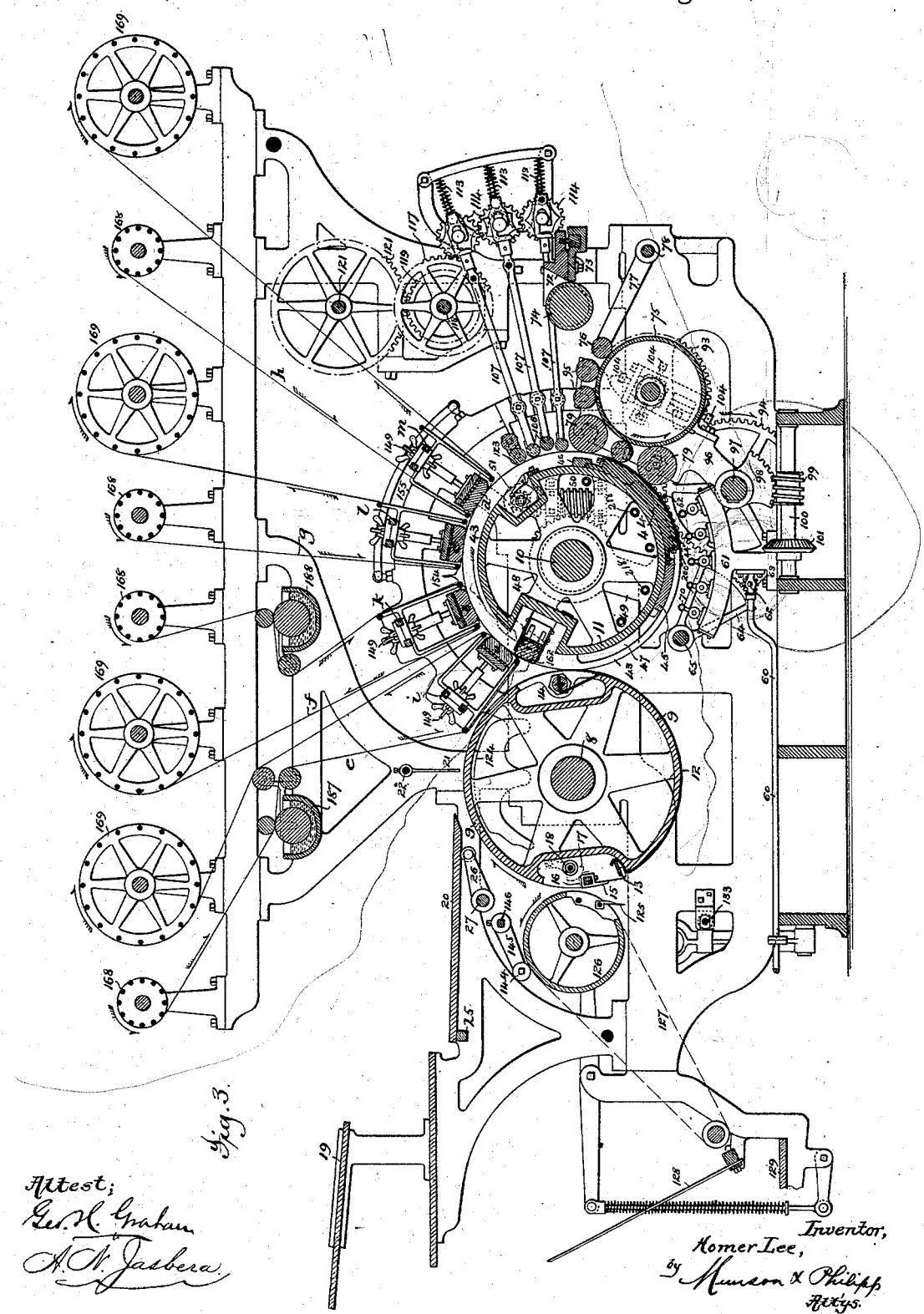
Figure 5:
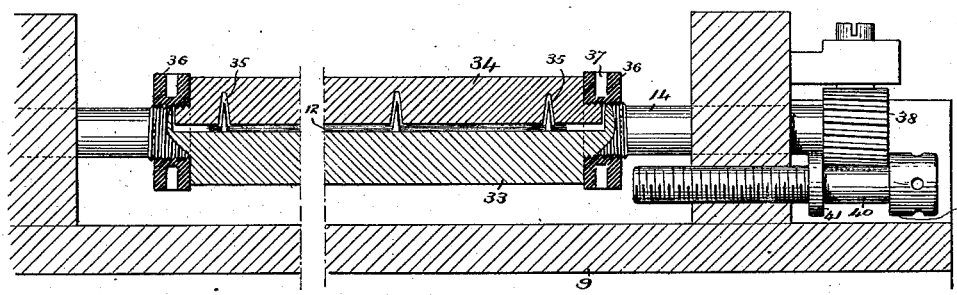
Figure 6:
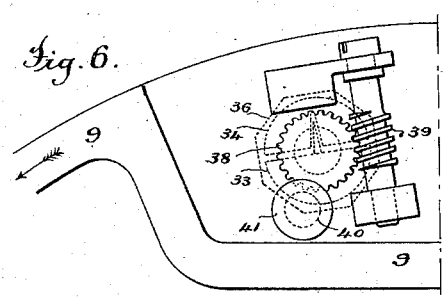
Figure 7:
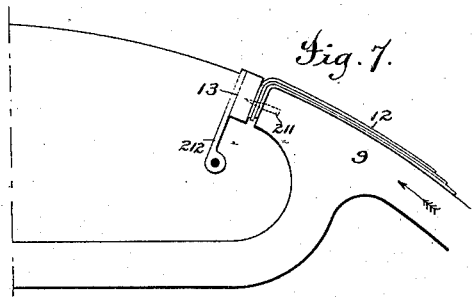
Figure 8:
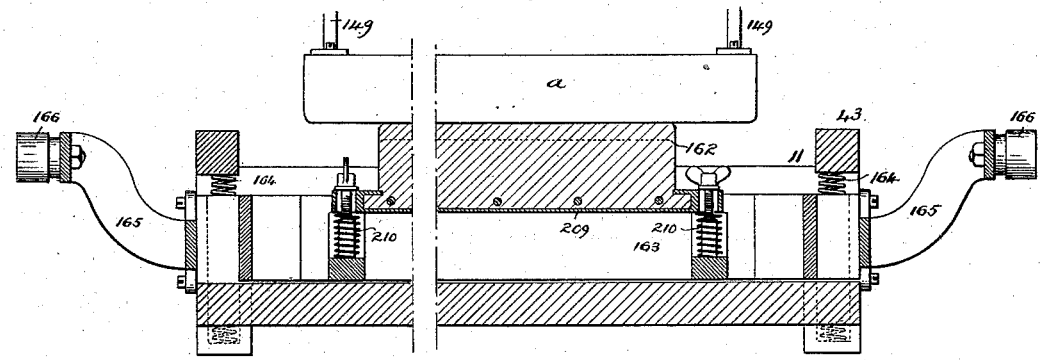
Figure 9:
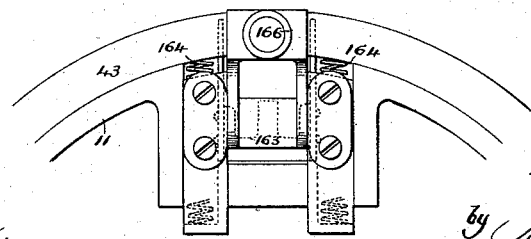
Figure 10:
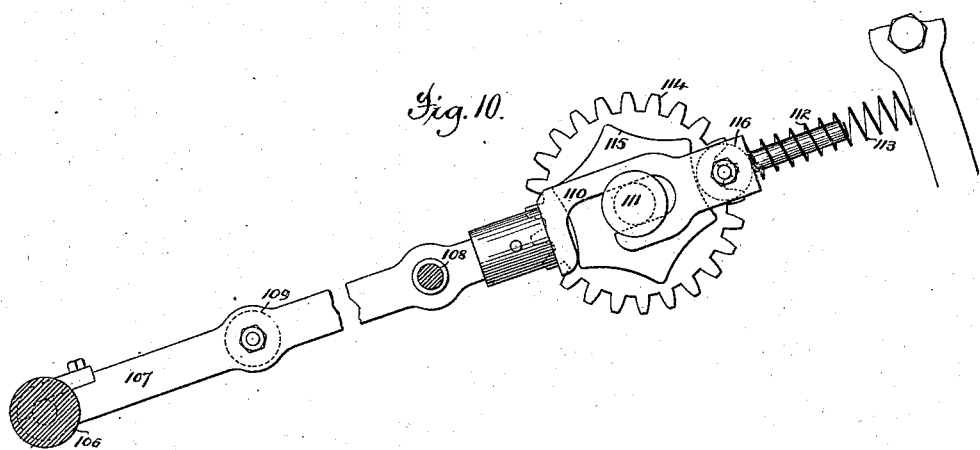
Figure 11:
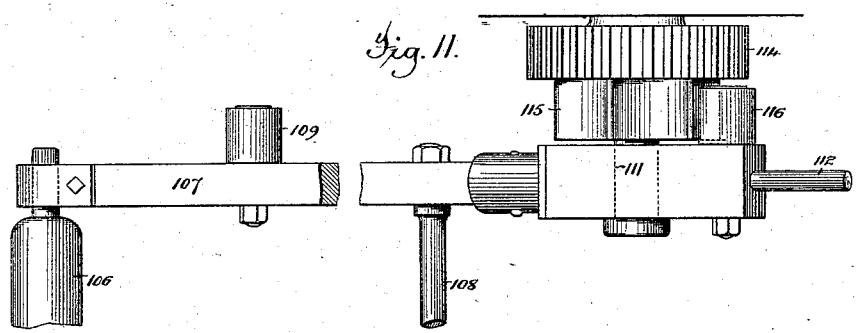
Figure 12:
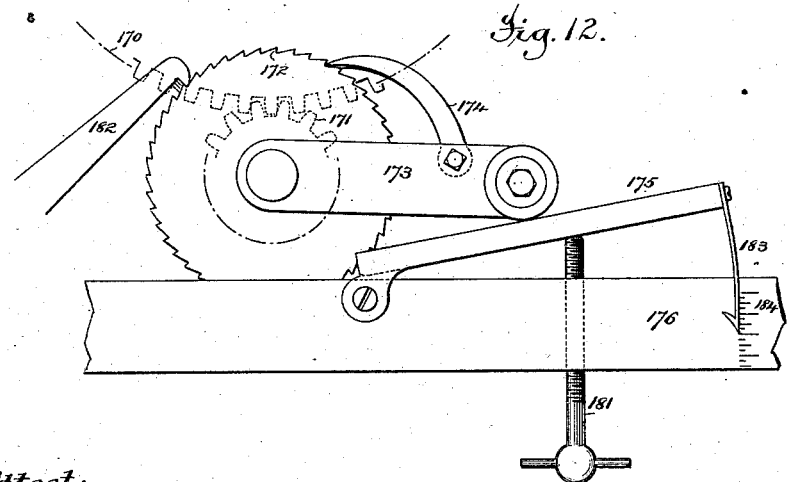
Figure 15:
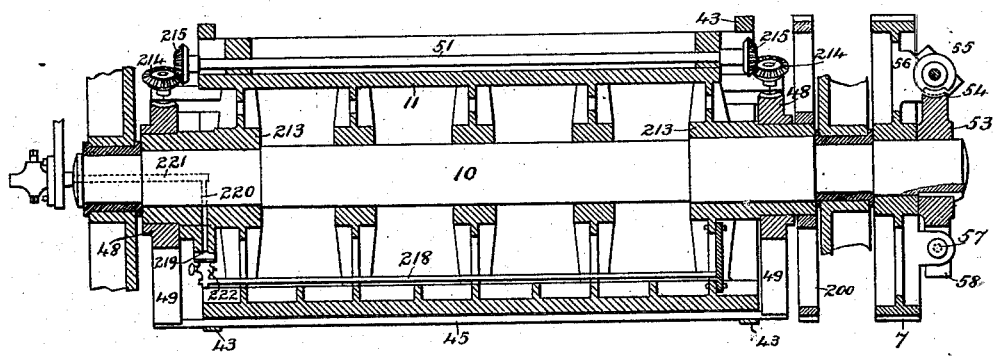
Figure 16:
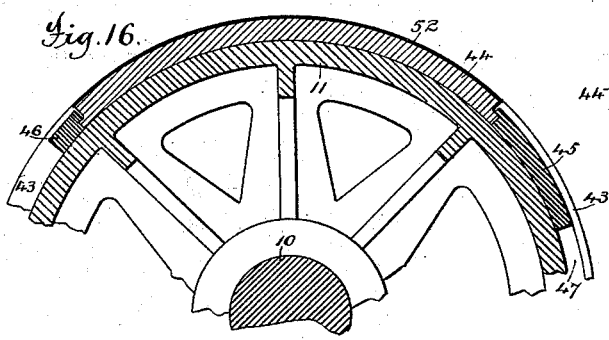
Figure 17:
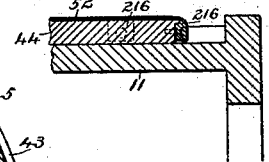
Figure 18:
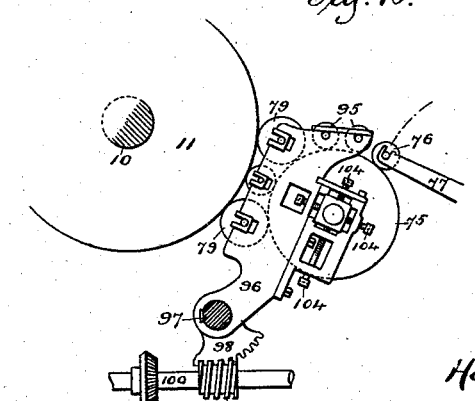
Figure 20:
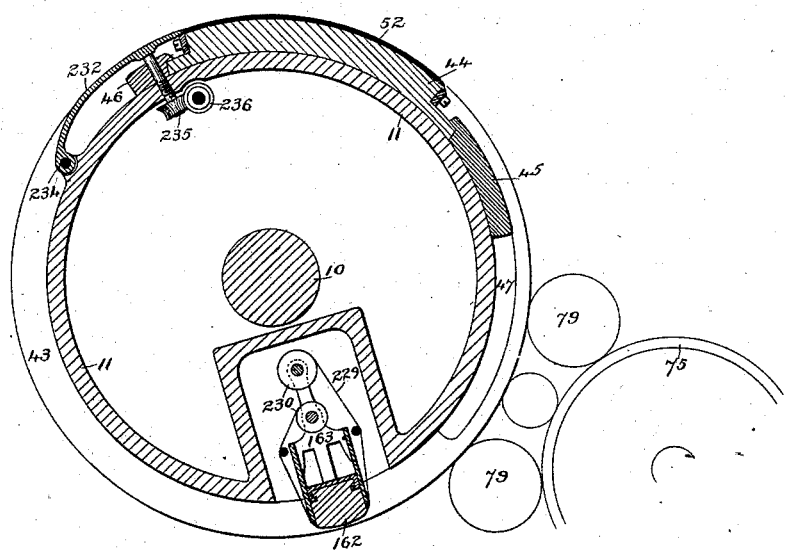
Figure 19:
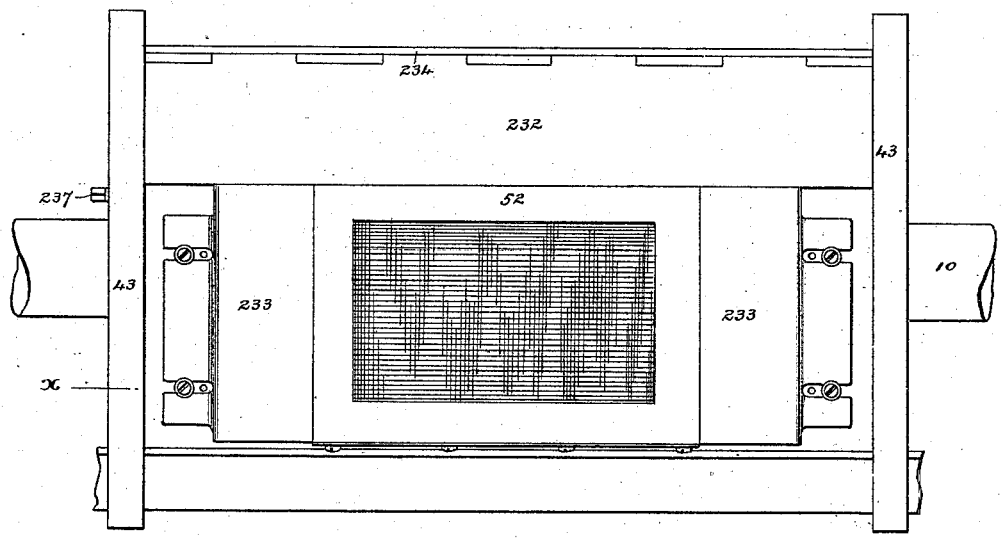
Figure 21:
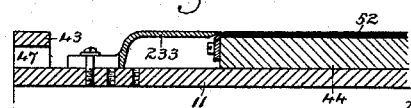
Figure 42:
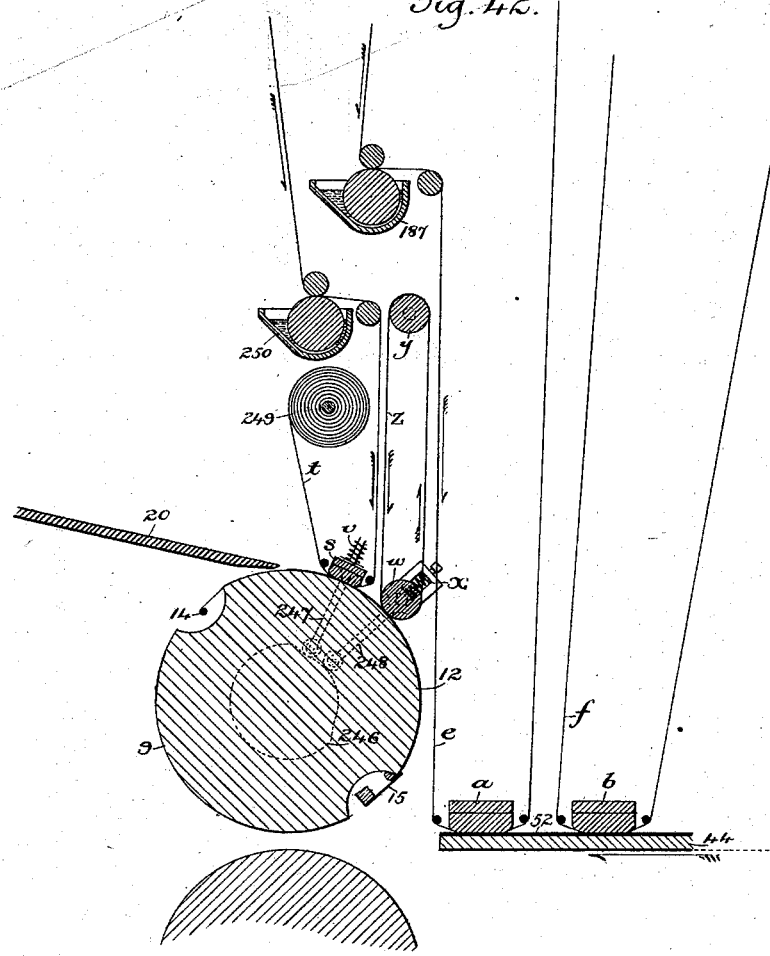

In the accompanying drawings, Figures 1 and 2 are opposite side elevations of a mechanism of the general construction shown in the Letters Patent referred to, but modified so as to embody the present invention. Fig. 3 is a longitudinal vertical section, and Fig. 4 a rear elevation, of the same. Figs. 5, 6, and 7 are details, illustrating devices for holding and regulating the tension and position of the blanket. Figs. 8 and 9 are details, illustrating an apparatus for applying polishing material to one of the wiping-cloths preparatory to polishing the plate. Figs. 10 and 11 are details, showing the construction and operation of a series of beaters for causing the ink to enter and fill the engraved lines of the plate. Fig. 12 is a detail of the ratchet mechanism for giving movement to the wiping-cloths. Fig. 13 is a plan view of two of the wiping-pads and the devices for giving them a circular movement. Fig. 14 is a diagram illustrating said movement of the pads, and showing their position with relation to each other at different points. Fig. 15 is a longitudinal vertical section of the plate-cylinder. Fig. 16 is a cross-section of the same. Fig. 17 is a detail showing the plate-clamps. Fig. 18 is a side elevation of the oscillating frame carrying the inking and distributing rolls. Fig. 19 is a plan view of the plate-cylinder, showing the plates for giving ink to the wiping-cloths before they come into contact with the engraved plate. Fig. 20 is a cross-section of the same, showing also an additional feature of the polishing apparatus, to be hereinafter referred to. Fig. 21 is a sectional detail taken upon the line $x$ of Fig. 19. Fig. 22 is a detail, showing in side elevation and section one form of apparatus for adjusting the pads with relation to the plate and regulating their wiping-pressure. Fig. 22$^a$ is a cross-section of the same taken upon the line $x\ x$ of Fig. 13. Figs. 23 and 24 are respectively an end view and side elevation of another form of apparatus for the same purpose. Figs. 25, 26, 27, and 28 are details, showing a pad inflated by a liquid or a gas. Fig. 29 is a plan view of the ink-fountain and fountain-roll, showing the devices for regulating the flow of the ink. Fig. 30 is a cross-section of the same. Fig. 31 is a side elevation of a rubbing or inking-in apparatus, which may be used instead of or in connection with the beaters. Fig. 32 is a plan view of the same. Figs. 33 and 34 are enlarged views, showing the structure of this apparatus. Fig. 35 is a diagram illustrating its movements. Fig. 36 is an end elevation, partly in section, showing this inking-in apparatus connected to one of the wiping-pads, the wiping-cloth passing under both. Figs. 37, 38, and 39 are sectional details showing a double wiping-cloth as used in different ways. Fig. 40 is a sectional detail showing the construction of an improved form of blanket. Fig. 41, Sheet 1, is a detail showing the devices for operating the grippers upon the delivery-cylinder; and Fig. 42 is a diagrammatic section, illustrating an apparatus for moistening and equalizing the moisture upon the sheets to be printed.

In the machine shown in the Letters Patent referred to the impression-cylinder is placed immediately beneath the plate-cylinder, which arrangement was found in many respects inconvenient and undesirable, and therefore in the present case the cylinders are mounted, as shown, side by side.

The cylinders and the other moving parts of the apparatus are driven from the main shaft 1, which is supported in bearings in the side frames of the machine, opposite the impression-cylinder. This shaft is provided with the usual fly-wheel, 2, and fast and loose pulleys 3 4, and with a pinion, 5, which engages with a gear, 6, fast upon the shaft 8 of the impression-cylinder 9. The gear 6 engages with a gear, 7, of like size, connected to the shaft 10 of the plate-cylinder 11, so that the two cylinders rotate together and at the same speed.

The impression-cylinder is provided with the usual blanket, 12, secured in a manner to be hereinafter described, and also with a set of grippers, 15, which are operated by a pinion upon their shaft 16, (see Fig. 3,) through engagement with a toothed segment, 17, mounted on a rock-shaft, 18, said shaft being provided at one of its ends with a rock-arm, the end of which carries an outwardly-projecting bowl or stud, which at the proper time is engaged by a stationary cam, 124, all in a manner well understood by those familiar with the art, and consequently needing no more specific description.

In order to compensate for slight variations in the thickness of different plates or blankets or different kinds of paper, and in order that the pressure exerted at the time of making the impression may be varied according to the kind of ink used, or the class of work being done, it is desirable that the impression-cylinder should be capable of slight adjustment with relation to the plate-cylinder. This is accomplished, in the present instance, by mounting the shaft of the impression-cylinder in movable bearings controlled by set-screws, as 32, so that said bearings can be adjusted to different positions to bring the impression-cylinder into proper relation with the plate-cylinder.

The sheets to be printed are taken one by one by the operator from the table 19 and transferred to the feed-board 20, the proper register being secured by bringing the side of the sheet against an ordinary side gage (not shown) and its end against the ends of the depending fingers 21. These fingers are secured to a transverse shaft, 22, and can be adjusted so as to vary the position which the front edge of the sheet shall take by means of a set-screw, 23, working in an arm attached to the end of the shaft 22, and impinging against the fixed part of the frame of the machine. The fingers 21 are constantly pressed forward by a weighted arm, 24, also secured to the shaft 22. The sheet, having been properly registered, is brought into a position to be taken by the grippers as follows: The rear edge of the feed-board is supported upon a rock-shaft, 25, its front edge being supported upon arms 26, extending from a second rock-shaft, 27, one of said arms having an extension, 28, the end of which is acted upon by a cam, 29, mounted upon the shaft of the impression-cylinder. This cam is so proportioned that as the grippers arrive at the proper position, and just as they are ready to close, the arm 28 will be allowed to drop, thereby rocking the shaft 27, so as to allow the feed-board to swing downward and carry the leading edge of the sheet below the ends of the fingers 21 and into position to be caught by the closing grippers. When the sheet has been carried entirely off the feed-board by the forward rotation of cylinder, the cam 29 will operate to raise the arm 28, and through it the feed-board, when a fresh sheet can be placed in position. The sheets taken by the grippers will be carried around upon the impression-cylinder and will receive impressions from the plate 52, after which, as the impression-cylinder continues its revolution, they will be taken by the grippers 125 of the delivery-cylinder 126 and transferred from the impression-cylinder to the carrying-tapes 127, by which they will be carried into position above a fly, 128, which, being oscillated in the usual manner, will deposit them successively upon the piling-table 129.

To prevent the sheets from sliding down the inclined tapes after being released by the grippers the delivery-cylinder is provided with a presser-roll, 144, mounted in arms 145, extending from a shaft, 146, this shaft being provided with an arm, 147, (see Fig. 2,) and adjusting-screw, 148, by which the pressure of the roll 144 can be regulated at pleasure.

The grippers 125, like the grippers 15, are mounted upon a rock-shaft provided with a segmental gear, and are operated from a second rock-shaft provided with a segmental gear and a rock-arm, 130, which, as the cylinder revolves, engages with a cam, 131.

It will be observed that the delivery-cylinder is only one-half the diameter of the impression-cylinder, and as but one sheet is produced during each revolution of the latter it follows that the former makes two revolutions while delivering each sheet, which fact makes it necessary that its grippers and the fly should be actuated only at each second revolution. To accomplish this the cam 131, which actuates the grippers, is mounted upon a rock-arm, 132, (see Fig. 2,) which is connected by a link, 133, with a like arm, 134, located upon the opposite side of the machine, as shown in Figs. 1 and 41, Sheet 1, the upper end of this arm being provided with a bowl, 135, which engages with a cam, 136, secured to the face of a gear, 137, which receives motion from a gear, 138, upon the shaft of the delivery-cylinder. The link 133 is provided with a spring, 139, the tendency of which is to rock the arms 132 134 to such position as to keep the cam 131 in the path of the arm 130, while the cam 136 is so shaped as to overcome the tension of the spring and rock the cam out of the path of the arm once during each second revolution of the delivery-cylinder. The gear 138 being of one-half the size of the gear 137, it follows that the arms 132 134 will be rocked so as to throw the cam 131 out of engagement with the rock-arm 130 at each second revolution of the delivery-cylinder, said arms being rocked in the opposite direction, so as to throw the cam 131 into engagement with the rock-arm 130 at other times by the spring. The gear 137 is provided with a second cam, 140, which, through a pivoted lever, 144, a link, 142, and a bell-crank lever, 143, provided with a segmental gear, operates the fly, as shown in Fig. 1.

The blanket 12, with which the impression-cylinder is provided, may be composed of any of the materials or combinations of materials commonly used for such purposes; but I have found that the most desirable blanket for use in plate-printing is one composed of an ordinary blanket covered by a sheet of rubber or rubber cloth, 31, and having a number of sheets of paper, as 30, placed beneath it. In some cases better results can be obtained by omitting the ordinary blanket, using only the paper and rubber cloth, as shown in Fig. 40. The number of sheets of paper used will vary with different classes of work, but ordinarily about twenty sheets will be used.

As in plate-printing it is necessary that great pressure be exerted, it is of the utmost importance that the blanket upon the impression-cylinder be very tightly and evenly stretched, and that the devices used to accomplish such stretching be capable not only of exerting a considerable degree of strain upon the blanket, but of ready and easy manipulation, as in use the blanket is continually stretching and slackening, and consequently requires frequent tightening. It also sometimes happens, particularly with a mechanism of the character herein shown, which works with great rapidity, that the feeder will fail to present a sheet to the grippers at the proper time, so that the impression from the plate, instead of being made upon a sheet, will be made upon the blanket, thereby soiling the same, and necessitating its removal before the printing can proceed. This liability makes it desirable that the blanket, or at least the outer ply thereof, should be so secured to the cylinder as to be capable of easy and quick removal. For these purposes the rear wall of the recess in which the grippers 15 are located is provided with a series of pins, 211, (see Fig. 7,) upon which the forward ends of the several sheets forming the blanket are impaled, the sheets being then carried backward around the cylinder and secured at their rear ends to the blanket-shaft 14. The cushion 13, upon which the grippers close, is mounted upon pivoted arms 212, so that said cushion can be swung forward out of the way when the blanket, or any part thereof, is to be impaled upon the pins, and can then be swung to the position shown, so as to hold the blanket in position upon the pins.

The tightening-shaft 14, to which the rear end of the blanket is secured, is made in two parts, 33 34, as shown in Fig. 5, the part 33, which is the main part of the shaft, and is journaled in the heads of the cylinder, being provided with a series of pins, 35, upon which the ends of the various sheets forming the blanket are impaled, the part 34 being placed over the ends of the pins and secured in position by screw-collars 36, said collars being either made of polygonal form, so as to receive a wrench for screwing them into and out of position, or being provided with recesses 37, into which can be inserted a short lever for the same purpose. The shaft 14 at one of its ends projects a short distance beyond its bearings in the head of the cylinder, and is provided with a worm-wheel, 38, in which works a worm, 39, as shown in Fig. 6, which can be operated by a wrench, screw-driver, or other suitable instrument, so as to cause the shaft to rotate, thereby winding the blanket around it and bringing it to any desired tension. It will readily be seen from this arrangement that as the blanket becomes stretched and loosened it can readily be tightened from time to time, as may be desired, and also that the outer ply or plies can be removed and replaced with but little trouble and loss of time.

As blankets of the construction heretofore specified are expensive and troublesome to make, it is desirable that they should be made as small as the size of the plate against which they operate will permit, and consequently it is desirable to provide a means by which the blanket can be readily adjusted laterally upon the cylinder to bring it into proper register with the edges of the plate. To accomplish this the shaft 14 is made capable of longitudinal movement in its bearings, and is held in position by means of a set-screw, 40, the head of which, as shown in Fig. 5, is provided with two shoulders or flanges, 41, arranged to bear against the opposite sides of the worm-wheel 38, so that by turning said screw, which can readily be done by means of a wrench or short lever inserted through the openings, (shown for that purpose in its head,) the shaft can be adjusted longitudinally, thus carrying the rear end of the blanket to any desired position upon the cylinder. The forward end of the blanket will of course be properly adjusted when it is impaled upon the pins 211.

In plate-printing as ordinarily conducted, it is necessary, in order to produce good results, that the paper should be dampened to a certain degree, which dampening is usually done before the sheets are supplied to the machine. It is found impossible, however, in practice to so evenly and thoroughly dampen the sheets that all shall contain the proper amount of moisture. In consequence of this it is always customary, when plate-printing is carried on by hand-presses, to examine each sheet to ascertain if it is properly dampened before it is placed upon the plate. If the sheet is found to be too dry, more moisture is supplied by passing a wet cloth over its surface, and if too wet some of the moisture is taken up by passing a dry cloth over it in the same manner. When, however, this class of printing is carried on by a mechanism of the character herein shown, or of that shown in my former Letters Patent No. 237,558, the sheets must be supplied to the machine so rapidly that no time is allowed the attendant to correct defects in the dampening. I have therefore provided the impression-cylinder with means for accomplishing the same result automatically. For this purpose I mount in suitable bearings, just in advance of the feed-board, a small elastic or yielding roll or pad, s, (see Fig. 42,) around which is passed a suitable moistening-cloth, t. The cloth t is led from a roll or cage, (not shown,) and after passing through a suitable moistening apparatus, 250, is led beneath the pad s and rewound upon a cage or roll, 249. The roll 249 is provided with a feeding mechanism, similar to that which will be hereinafter described in connection with the wiping-cloth, by which the cloth t is advanced beneath the pad s at a proper speed. The pad s is provided with suitable springs, as v, by which it is caused to bear against the impression-cylinder with a suitable pressure.

Just in advance of the pad s a small roll, w, is mounted in suitable bearings, and is provided with suitable springs, x, by which it is caused to bear gently upon the impression-cylinder. At a suitable distance above the roll w there is supported a second roll, y, around which and the roll w there passes a dry absorbent endless cloth, z. The rolls w and y are left to turn freely in their bearings, so that the cloth z is moved by frictional contact with the impression-cylinder. From this arrangement it results that as the sheets are taken by the grippers 15 and carried forward by the cylinder they will be rubbed against and receive some moisture from the cloth t, which will supply any deficiency in the original dampening. After being thus dampened upon the surface they will pass in contact with the dry cloth z, which will remove any surplus moisture, and place the sheet in proper condition to receive the impression.

In operating a machine of this kind it sometimes happens that the rear end of the plate extends beyond the rear end of the sheet upon the blanket, and when this happens the blanket is liable to receive a line of ink at the point corresponding to the rear end of the plate. This being the case, if the cloths t and z were allowed to press continually against the impression-cylinder, they would soon become so smeared with ink as to soil and destroy the paper. To avoid this the shafts of the pad s and roll w are provided at each end with loosely-mounted arms 247 248, which are acted upon by cams 246 upon the shaft of the impression-cylinder, so as to lift the pad and roll out of contact with the cylinder at the proper time to prevent the cloths t and z from taking ink from the blanket. For the sake of clearness of illustration this apparatus is omitted in the principal views of the mechanism, and although in Fig. 42 it is illustrated as applied to the impression-cylinder of a flat press, it will of course be seen that it can be applied equally well to the cylinder of a rotary press.

The plate-cylinder 11 is provided at its ends with rims or flanges 43, between which rests the plate-bed 44, consisting of a heavy plate, of cast-iron or other suitable material, curved to fit the contour of the cylinder, and provided with means by which the engraved plate is secured to its surface. The plate-bed is secured to the cylinder by means of two clamping-bars, 45 46, which have their edges rabbeted to match with the rabbeted edges of the bed. One of these clamping-bars, 46, as shown in the present case, is rigidly attached to the cylinder by screws or other suitable devices, while the other moves in slots 47 in the flanges 43, and is provided with means by which it can be adjusted to and secured in different positions. This adjustability, which not only provides a ready means for the introduction and removal of the bed, but permits the use of beds of different sizes, is effected by the following devices: Upon the extended ends of the hubs 213 of the cylinder 11 (see Figs. 3 and 15) are placed a pair of loose hubs, 48, to which are secured arms 49, which extend outward and embrace the ends of the clamping-bar 45, which extend through the rims 43 of the cylinder. Upon one of their sides the hubs 48 are provided with teeth, forming segmental gears, with which engage worms 50, the shafts of which are journaled in brackets 217, (see Fig. 2,) attached to the heads of the cylinder. The worm-shafts are provided with bevel-gears 214, which engage with similar gears, 215, upon a shaft, 51, situated in a longitudinal depression of the cylinder and journaled in its head. One end of the shaft 51 projects beyond its gear, and is formed to receive a key or wrench by which it can be turned, so as to simultaneously operate the worms upon both ends of the cylinder, thus rotating the hubs 48, and through them moving the bar 45 to any desired position. By means of these devices, as will readily be seen, the bed can be locked in position or unlocked for removal, and the position of the clamping-bar 45 can be varied so that beds of different sizes can be used. The shaft 51, in addition to the gears already mentioned, is provided with a ratchet, as shown in Fig. 3, by which, through engagement with a stationary pawl, it is held in any position to which it has been moved, thus preventing the worms 50 from being turned and the bar 45 loosened by the jarring of the machine in operation. When the bed 44 does not extend the entire distance between the flanges 43, wedges may be driven between the bed and said flanges to prevent lateral displacement. The bed 44, as shown in Figs. 17 and 21, will usually be less in width than the length of the cylinder, and consequently will be capable of lateral adjustment, by which means the position of the plate can be varied so as to regulate the width of the side margins of the printed sheet.

The engraved plate 52 is curved to correspond with the surface of the bed 44, and is secured thereon by means of clamps 216, which are fastened to the edges of the bed and extend over the beveled edges of the plate, as shown in Fig. 17. The clamps 216 may be made sufficiently long to embrace the entire edge of the plate, or there may be several short clamps on each side of the plate.

The clamping-bar 46, which, as already explained, is rigidly secured to the cylinder, determines the position of the forward end of the bed 44, and consequently of the engraved plate upon the cylinder. This position must be such with relation to the grippers upon the impression-cylinder that the forward end of the plate and the head of the sheet will register, allowance being made for a proper margin upon the printed sheet. It is often desirable, however, that the width of this margin should be varied, to accomplish which it is necessary that the position of the bar 46 with relation to the grippers upon the impression-cylinder should be changed. This change of position is effected in the following manner: The gear 7, by which the plate-cylinder is driven, is loose upon the shaft 10, but communicates motion thereto through the collar 53, which is keyed to the shaft and connected to the face of the gear by means of a segmental gear, 54, with which it is provided upon one of its sides, and a worm, 55, the shaft of which is mounted in brackets 56, secured to the face of the gear. It will now be readily seen that when the worm 55 is operated, which may be done by a key or wrench applied to the end of its shaft, the cylinder will be caused to turn with its shaft 10, while the gear 7 remains stationary, the effect being to change the position of the cylinder with relation to its gear, and consequently of the forward end of the plate with relation to the grippers upon the impression-cylinder, thus varying the width of the margin to be left at the head of the printed sheet. When the plate-cylinder is properly adjusted for any particular plate, it is securely locked to its driving-gear by means of the set-screws 57, working in lugs upon the face of the gear and impinging against the opposite sides of the arm 58, extending from the collar 53.

It is found in practice that in wiping an engraved plate by means of reciprocating pads, as in the present case, it frequently happens that less ink is removed from the engraved lines of those portions of the plate which pass beneath the ends of the pads than from those portions which pass beneath the center of the pads. It also frequently happens that it is desirable to allow different amounts of ink to remain in the lines of different parts of the engraving, so that some parts will be printed comparatively light while other parts are printed comparatively heavy or dark. By reason of the provision for the lateral and circumferential adjustment of the plate-bed, hereinbefore described, (the circumferential adjustment being effected by the adjustment of the plate-cylinder,) it becomes possible to so adjust the position of the plate with relation to the wiping-pads (due regard being paid to the position of the pads at the time the plate passes beneath them) that the part of the engraving which it is desired should retain the most ink will pass beneath the ends of the pads.

It has been found, in operating printing-machines of this general character, that it is desirable, particularly if damp wiping-cloths are used, to heat the plate to a considerable degree in order to drive away all moisture that might be left upon the plate after its passage beneath the wiping-cloths, and also because the ink works more satisfactorily and produces a better print when the plate is heated. I have also found that the heating of the plate can be better and more economically accomplished by applying the heat both upon its face and back. For this purpose two sets of gas-burners are employed, one set being attached to the frame of the machine and located beneath the cylinder, so that in its revolutions it will carry the face of the plate over them, the other set being located inside the cylinder, so that the flame is close to the plate-bed. The outside or stationary set of burners is attached to pipes 70, which extend transversely of the machine beneath the cylinder. The ends of these pipes communicate with hollow brackets 61, (one at each side of the machine.) The brackets 61 are supplied with gas from the pipe 60, the bracket at the opposite side of the machine receiving its supply from the first through a connecting-pipe, (not shown,) the pipes 70 being thus fed from both ends, so that the size of the jets of flame issuing from all the burners will be practically uniform and the plate be equally heated over its entire surface. The pipes 70 are provided with cocks at each end, by which the gas may be partly or wholly shut off from any one or more of them, so as to regulate the amount of heat which shall be applied to the plate. Inasmuch, however, as the plate occupies but a small part of the periphery of the cylinder, the heat given off by the burners, as thus far described, would be largely wasted, because, except during the short time when the plate is passing above them, no surface is near them which it is desirable to heat. This of course would occasion the consumption of an unnecessary amount of gas and correspondingly increase the cost of operating the machine. To avoid this useless expense I provide the pipe 60 (see Fig. 3) with a cock, 62, the plug of which is provided with a small gear, 63, which is engaged by a segmental gear, 64, mounted upon a rock-shaft, 65, provided with an arm, 66, (see Fig. 2,) which, through a link, 67, and lever 68, is operated from a cam, 69, upon the shaft of the impression-cylinder. The cam 69 is of such form that when the plate 52 is passing above the pipes 70 the cock 62 will be opened to permit the full amount of gas to flow, and that at all other points of the revolution of the plate-cylinder the cock will be so nearly closed as to largely shut off the flow of gas, thus permitting but a small amount of heat to be emitted and saving a considerable portion of the gas. The link 67, as shown in Fig. 2, is capable of being adjusted to different positions upon the lever 68, so as to open and close the the cock to different extents, as may be desired. The cam 69 may be so formed as to move the lever 68 in both directions; but the form shown is preferable, the return motion of the lever being accomplished by a spring, 71, arranged as shown in said figure. The other set of burners is carried upon longitudinal pipes 218, (see Fig. 15,) located upon the inside of the cylinder in close proximity to the plate-bed. The pipes 218 are supplied with gas from the hollow bracket 219, fast upon the head of the cylinder, which bracket communicates, through the radial and axial openings 220 221 in the shaft 10, with the supply-pipe 60. The pipes 218 are provided with cocks 222 for regulating the amount of heat applied to the back of the plate.

The plate 52 is supplied with ink from a fountain, 72, mounted upon a transverse bar, 73, secured to the frame of the machine in any convenient manner, and which is provided with the usual fountain-roll, 74, from which the ink is transferred to a distributing-roll, 75, by a vibrating roller, 76, mounted in arms 77, fast to a rock-shaft, 78, the ink being taken from the distributing-roll and applied to the plate by ordinary form-rolls, 79. The distributing-roll 75 is also provided with the usual riders, 95. These parts receive their motions in the following manner: The driving-shaft 1 is provided with a bevel-gear, 80, which engages with a like gear, 105, upon the longitudinal shaft 81, the rear end of which is provided with a gear, 82, which engages with a like gear, 83, upon a short shaft, 84, (see Figs. 1 and 4,) this shaft being provided with a bevel-gear, 85, which meshes with a like gear, 86, upon the lower end of a vertical shaft, 87. The shaft 87 is provided with a bevel-gear, 88, which, through a like gear, 89, communicates motion to the shaft 90 of the fountain-roll 74. The opposite end of the shaft 90 is provided with a cam, 91, which engages with a rock-arm, 92, fast to the rock-shaft 78, which supports the vibrating roller 76. The shaft of the distributing-roll 75 is provided with a gear, 93, so as to receive motion through an idle-gear, 94, from a gear, 200, (see Figs. 3 and 15,) fast to the shaft of the plate-cylinder.

It will be observed, when the parts are all in working position, as shown in Fig. 3, that the plate-cylinder is so surrounded by other mechanisms that little or no space is afforded for access to said cylinder to secure or remove the plate or the bed. In order to provide for such removal, the distributing-rolls 75 95 and the form-rolls 79 are mounted in a frame, 96, (see Figs. 3 and 18,) secured to a rock-shaft, 97, so that by operating said shaft these devices can, when desired, be lowered away from the plate-cylinder, so as to give access thereto. To provide for the raising and lowering of these devices, the rock-shaft 97 is provided with a segmental gear, 98, which engages with a worm, 99, mounted upon a shaft, 100, and operated through bevel-gears 101 102 from a hand-wheel, 103, located at the side of the machine. The form-rolls 79 are mounted in open bearings, so as to simply bear with their own weight upon the distributing-roll, and as in machines of this character it is necessary that the form-rolls should be adjusted with great nicety, so as to secure an even distribution of ink upon all parts of the plate, the bearings of the distributing-roll 75 are made adjustable, both vertically and horizontally, so as to bring said roll, and with it the form-rolls, to any desired position with relation to the plate-cylinder and its plate. This adjustment of the distributing-roll is effected by means of set-screws 104, arranged to impinge against the four sides of its journal-box, as shown in Fig. 3.

In this class of printing it is frequently desirable to vary the quantity of ink delivered to the plate, some plates and styles of work requiring much more ink than others. It is also desirable in some classes of work that one side of the plate should receive more ink than the other. To accomplish the first of these results the fountain 72 is made adjustable with relation to the roll 74, it being for this purpose mounted loosely upon its support and attached to a bar, 203, (see Figs. 29 and 30,) the under side of which is provided with an inclined groove, in which rests a rib, 204, projecting from a bar, 205, which slides in a channel formed in the support 73, the bar 205 being provided with a threaded rod, 206, which is operated by a nut and hand-wheel, 207, attached to the frame of the machine. It will thus be seen that by turning the nut 207 the fountain can be moved to or from its roll, so as to allow the latter to take out a greater or less quantity of ink. To accomplish the second result the bar 204 is attached to the fountain by means of a series of right-and-left-hand screws, 208, by the turning of which the opposite ends of the fountain can be adjusted to different distances from the roll, so that different quantities of ink will be taken by the roll at its opposite ends. The foregoing results may of course be accomplished by making both ends of the fountain-roll independently adjustable with relation to the fountain; but the way described is preferable.

In order to produce a good impression from an engraved or intaglio plate, it is necessary that the plate should be thoroughly "inked in"—that is to say, the ink should be evenly and fully forced into all of the engraved lines, so that after the wiping is done none of the lines will be left without ink.

In presses in which the inking and wiping are done automatically—as in the present case—great difficulty has heretofore been experienced in so thoroughly filling the lines of the plate that the wiping would not remove the ink from some of the lines, and so cause a defective or worthless print. To secure a more complete and perfect filling of all the lines of the plate, I have in the present mechanism provided what I term a "series of beaters," which consist of small rolls or pads, 106, covered with leather, or otherwise made slightly elastic, and mounted in such position as to come in contact with the plate immediately after the inking, and which are caused to strike in rapid succession upon the freshly-inked plate and grind or drive the ink into all the engraved lines. These rolls are loosely journaled in the ends of a series of arms, 107, secured in proper relation to each other by tie-rods 108, and provided at their lower ends with anti-friction rollers 109, which lie in ways formed in a suitable frame-work. The outer ends of the arms 107 are provided with slots 110, as shown in Fig. 10, through which pass the ends of a series of short shafts, 111, supported in a suitable frame-work just inside the main frame of the machine. The extreme outer ends of the arms 107 are provided with extensions 112, around which are coiled spiral springs 113, which rest against the fixed part of the frame-work and press the arms and the beaters 106 constantly inward. The shafts 111 are provided with connecting-gears 114 and cams 115, which latter operate upon studs or bowls 116 secured to the arms 107. The series of gears 114 are connected with and receive motion from gears 117, upon a transverse shaft, 118, which is also provided with a gear, 119, engaging with a gear, 120, upon a transverse shaft, 121, which in turn receives motion through bevel-gears 122 from the vertical shaft 87. From this construction it will be seen that a rapid reciprocating motion will be imparted to the arms 107, which will cause the beaters 106 to strike rapidly against the inked plate, thereby forcing the ink into all the lines of the engraving. When the plate is not in position to be struck by the beaters their inward motion will be arrested by the shafts 111. After the inking-in just described the plate is next carried by the revolution of the cylinder beneath the redistributing-roll 123, by which the ink will be redistributed over the plate and still farther pressed into the engraved lines, after which the plate is carried to the wiping and polishing apparatus, by which the ink upon the raised parts of the plate is removed and the plate brought to the proper condition for making the print. The roll 123 will also be found useful in many cases when beaters are not employed.

The wiping and polishing apparatus consists of a series of reciprocating pads, $a\ b\ c\ d$, around which pass intermittently-moved wiping-cloths $e\ f\ g\ h$, this apparatus being in its general structure and operation the same as that shown in the Letters Patent hereinbefore referred to. In said patent all of the pads had a simple reciprocating motion across the plate as it moved beneath them. This motion of the pads proved in most cases satisfactory, and wiped the plate in such a manner as to produce good prints; but in some cases it was found that where the lines of the engraving were parallel, or nearly so, to the direction of the movement of the pads across the plate the wiping action of the pads would remove more or less of the ink from the engraved lines, so that an imperfect or dull print resulted. To obviate this defect I have in the present case provided two of the pads, $c\ d$, with devices by which they, instead of receiving direct reciprocatory motion across the plate, are given a circular movement, so that their travel across the plate is never in a line at right angles to its travel, and whereby they are prevented from moving any considerable distance in the same direction with any of the engraved lines upon the plate. To still further prevent the wiping-out action of these pads they are caused to move in opposite directions, so that any wiping out which by chance may be effected by one pad will be compensated for by the opposite movement of the other.

In some cases it may not be found necessary or desirable to cause more than one of the pads to move in this manner, and in others it may be found desirable to give three or even all of them this motion.

The pads $a\ b\ c\ d$, which may be constructed in either of the ways set forth in my former Letters Patent, No. 237,558, or may be of a construction to be hereinafter explained, are adjustably and yieldingly suspended by rods 149 from a corresponding series of bars, $i\ k\ l\ m$, having bearings in upwardly-extending portions 223 of the side frames of the machine. The rods 149 are supported in clamping-plates 150, and are provided at their upper ends with nuts, as shown in Figs. 13, 22, and 24, by which the pads can be adjusted to any desired position with relation to the plate. The pad-supporting bars are longitudinally slotted, as shown in Fig. 13, and the clamping-plates 150 are made in two parts secured together by bolts, so that they can be adjusted to any desired position upon the bars, thus adapting the supporting devices for use in connection with pads of any desired length. The pad-supporting bars are also provided with brackets 153, in which are supported rods 154, which, as shown in Fig. 3, serve to guide the cloths in their passage around and beneath the pads.

A yielding and variable pressure may be given to the pads in either of two ways, as shown in Figs. 22, 23, and 24. In the first case the lower members of the clamping-plates 150 are provided with downwardly-extending bosses 151, provided with nuts, between which and the pads rest spiral springs 152, the tension of which can readily be controlled by said nuts, so as to cause the pads to bear upon the plate with any desired pressure, and yet be sufficiently yielding to prevent undue wear or strain. In the second case the bosses 151 are omitted from the lower members of the clamping-plates, and the rods 149 are provided with jam-nuts, by which the pads, when properly adjusted, can be set in position, and the projections 223, in which the boxes 224 of the pad-bars are supported, are made of such height as to permit said boxes to have a vertical motion. The boxes 224 are suspended from rods 225, supported in removable caps 226, and are provided at their upper ends with nuts, by which the position of the boxes can be adjusted, so as to vary the position of the pads with relation to the plate. The caps 226 are provided upon their undersides with bosses carrying nuts, between which and the boxes 224 are confined springs 227, the tension of which can be varied by the nuts upon the bosses, so as to give any desired pressure to the pads. This last arrangement will in most cases be found preferable when the pads have a simple reciprocating motion, as by it the pressure and position of the pads can be regulated while the machine is in operation.

In order to permit the pads c d to have the circular motion heretofore referred to, the side frames of the machine are provided with curved ways 155, (see Fig. 3,) in which the bearings of their supporting-bars rest, so as to be capable of a forward and backward movement. The devices by which the circular movement is imparted to these pads are as follows: The outwardly-projecting ends of their supporting-bars are provided with openings, into which enter studs 228, fixed in brackets 156, secured to the face of the gears 157, (see Figs. 1, 2, 13, and 22,) mounted to turn in suitable bearings upon the outside of the frame of the machine, these gears engaging with each other and with the gears 158 upon the shafts 159, which, through gears 160, receive motion from the transverse shaft 118.

It will be observed that the brackets 156 are provided with several openings placed at different distances from their axes, so that the studs can be placed in different positions and the amount of movement given to the pads be varied at pleasure.

It will also be observed, by reference to Figs. 13 and 14, that the studs 228 are so located on the brackets that the pads are always moving in opposite directions.

Figure 4:
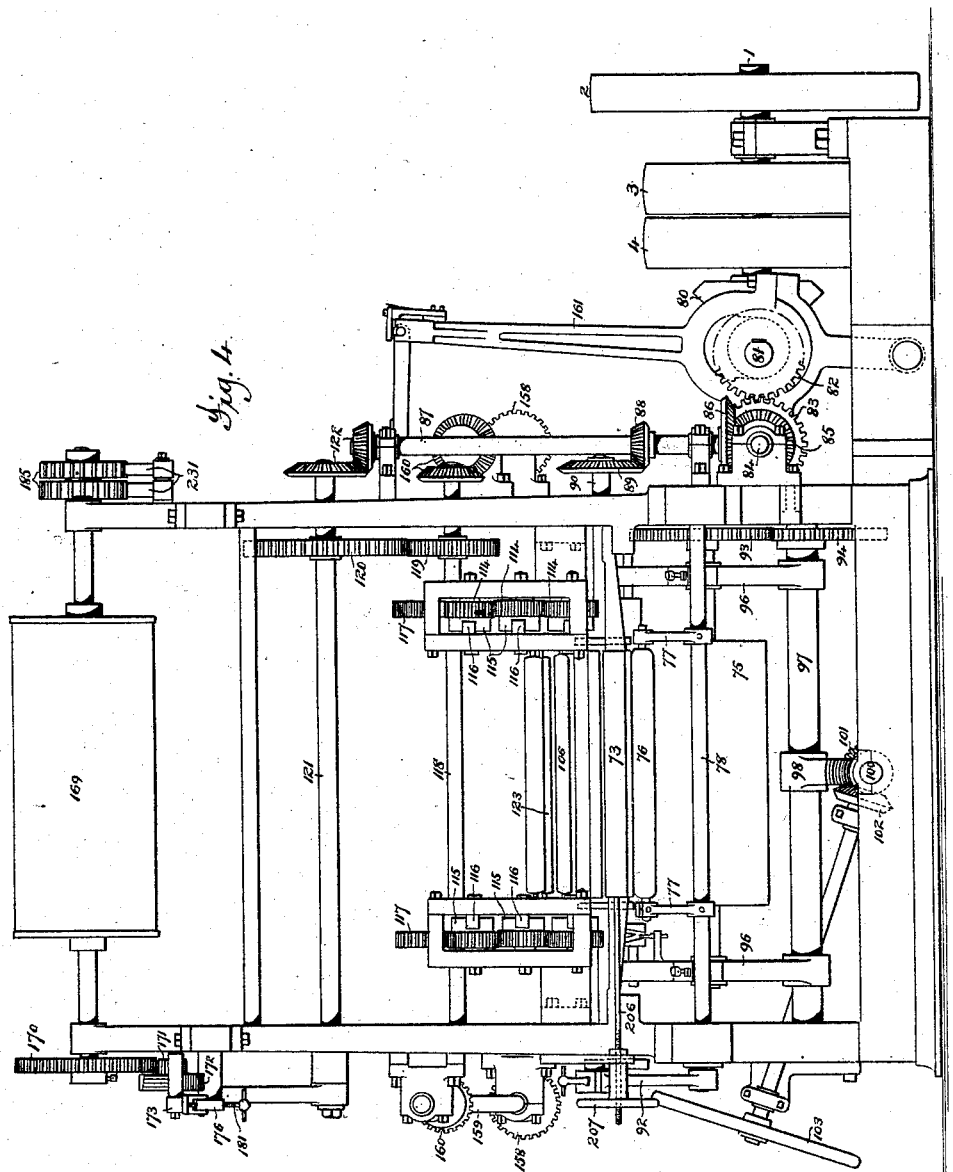

The pads a b receive their reciprocating motion from eccentrics carried by the shaft 81, said eccentrics working in bearings in the vertical oscillating levers 161, as shown in Figs. 1 and 4. The amount of longitudinal movement given to these pads may of course be varied by varying the size of the eccentrics by which they are driven, and they may, by properly arranging the eccentrics upon the shaft 81, be caused to move synchronously, or the reverse. It will usually be found desirable, as shown in the present case, to cause these pads to move different distances, the pad b moving a longer distance, and consequently at a greater rate of speed, than the pad a. In this class of printing it is desirable, after the ink has been removed from the raised portions of the plate, to slightly polish the same before the impression is made. For this purpose I have provided the plate-cylinder with devices by which a suitable amount of whiting or other polishing material is applied to the cloth e as it passes over the pad a, so that said cloth and pad not only act to complete the wiping of the plate, but also to polish the same. The whiting for this purpose may be in the form of a brick, 162, which is placed in a suitably-formed receptacle, 163, mounted in a longitudinal recess in the plate-cylinder, (see Figs. 8 and 9,) and provided with springs 164, by which it is held inward to the bottom of said recess, so as to keep the brick of whiting out of contact with the pads b c d while passing beneath them. To bring the whiting into contact with the cloth passing over the pad a, the receptacle 163 is provided with outwardly-extending arms 165, carrying bowls 166, which, as the cylinder revolves, are brought into contact with stationary cams 167, so as to throw the whiting-carrier outward and bring the brick in contact with the cloth passing over the pad a. This pad being reciprocated at the time, it will take up some of the whiting and apply it to the plate when the same passes beneath it. The bowls 166 will then pass off the cams 167, allowing the whiting-carrier to resume its normal position, where it will remain until again acted upon by the cams. The brick of whiting is secured to the carrying-plate 209, which, as shown in Fig. 8, rests upon springs 210, so that the brick will be presented to the cloth e until nearly consumed. To prevent the brick of whiting from being broken or crumbled by the movements of the pad, an open-meshed cloth, 229, may be stretched around it, as indicated in Fig. 20. The cloth 229 will be of such open texture that the movements of the pad upon it will cause the whiting to be rubbed off the brick and pass through the meshes of the cloth 229 in sufficient quantities to be taken by the cloth upon the pad a.

It will sometimes be found desirable, in order to prevent the brick of whiting from crumbling or breaking, to mix hair or other fibrous material into the mass from which the brick is molded while in a plastic state. It will also be found desirable in many cases to mix lamp-black or other coloring-matter into the whiting, so as to give the latter the color of the ink used, and thus prevent injury to the print in case any of the polishing material should remain upon the plate.

Instead of using a brick of whiting a pad or block may be mounted in the position of the brick, and a cloth, as 229, impregnated with whiting may be fed across said block or pad, so as to give off its whiting to the polishing-cloth. In such case a considerable length of cloth will be wound upon one of the rolls 230, and will, by suitable mechanism, be gradually unwound from said roll and rewound upon the other. The wiping and polishing cloths are wound upon skeleton carriers 168, and after passing beneath the pads and accomplishing the wiping are taken up upon like carriers 169. The carriers 169 are provided with gears 170, which engage with pinions 171, the shafts of which are provided with ratchets 172, and with short oscillating arms 173, carrying pawls 174. The free ends of the arms 173, which are preferably provided with anti-friction bowls, rest upon inclined ways 175, secured to a reciprocating bar, 176, suitably supported upon the side of the frame, all as shown in Fig. 2. The under side of the bar 176 is provided with a rack, 177, which engages with a segment, 178, upon one end of a bell-crank lever, 179, the opposite end of which is acted upon by an eccentric, 180, fast to the shaft 121. From this construction it will be seen that as the bar 176 reciprocates a rising-and-falling movement will be given to the oscillating arms 173, which, through the pawl and ratchet mechanisms will impart an intermittent rotary movement to the take-up carriers 169, and thus cause the wiping-cloths to be drawn slowly beneath the pads, so as to present fresh surfaces to the inked plate at each revolution of the plate-cylinder.

The ways 175 are pivoted to the bar 176, as shown in Fig. 12, and are arranged so as to be acted upon by set-screws 181, so as to receive any desired degree of inclination by which the throw of the pawls 174 can be increased so as to give any desired amount of feed to the cloths. This is an important feature, as by it the feed of the different cloths can be varied so that those acting last upon the plate, and consequently being less soiled by the ink, can be fed more slowly than those which act first upon the plate. The ratchets 172 are provided with holding-pawls 182, which prevent the cloths from being drawn off from the take-up carriers by the action of the plate in passing beneath the pads. For convenience in adjusting the ways 175, they are provided with pointers 183, which lie close to scales 184 upon the bar 176. This serves to aid the pressman in determining the exact amount of feed given to the cloths and in adjusting the feed of the different cloths with relation to each other.

The skeleton carriers 168, from which the cloths pass to the pads, are provided with double cog-wheels 185, engaged by weighted pawls 231, which tend to hold the carriers in position to resist the unwinding of the cloths, the cogs of the wheels 185 being so arranged, as shown in Fig. 1, that one of the pawls is always in engagement with one of said wheels, thereby always exerting a tension upon the cloths, and not permitting them to slacken, as would be the case if only one pawl and wheel were used. The weights 186 of the pawls are made adjustable, as indicated at the right of Fig. 1, so that the tension of the wiping-cloth can be regulated at will to suit the character of work being done, or the kind of ink used.

The carriers 169 are made of large size, so that a large amount of cloth can be wound upon them without materially increasing their diameters, thereby permitting the feed of the cloths to be practically uniform while the whole web is being wound upon them.

In the machines shown in the Letters Patent hereinbefore referred to the wiping-cloths were fed against the movement of the plate, so that clean portions of the cloths were always upon the front sides of the pads, and acted upon the plate after the soiled portions had acted. It was found in practice, however, that this was to some extent a disadvantage, as the ink was more liable to be wiped out of the engraved lines by a clean cloth than by one which contained a small amount of ink. To avoid this difficulty I have provided the plate-cylinder, just in advance of the plate-bed, with an ink-plate, 232, (see Figs. 19 and 20,) so arranged that it will receive ink from the rolls 79 and be wiped by the cloths, the same as the plate. By this means the wiping-cloths will, before they come in contact with the engraving, become somewhat soiled, and be rendered less liable to remove the ink from the engraved lines. To still further guard against the wiping-out action of the cloths, I also provide the cylinders with lateral ink-plates 233, which serve to give ink to the side portions of the wiping-cloths, which are carried onto the engraving by the reciprocations of the pads.

The plate 232 may be arranged in any convenient manner, but will preferably be hinged at its forward edge to the cylinder, as shown at 234, and provided with one or more adjusting-screws, 235, by which its rear edge can be adjusted so as to be just flush with the plate. For convenience in adjusting the plate the screws 235 may be provided, as shown in Fig. 20, with pinions, which are engaged by worms 236, the shaft of which extends beyond the head of the cylinder, as shown at 237, and can be operated by a wrench or other suitable tool. The plates 233 will also be made to lie just flush with the engraved plate, and may be made adjustable, as shown in Figs. 19 and 21, so as to operate in connection with plates of different sizes.

Instead of providing the cylinder with ink-plates, as 232 233, the margins upon the engraved plate may be made of sufficient width to serve the same purpose; or a second plate, similar to the plate 52, may be placed just in advance thereof and be inked and wiped in the regular way, but not printed from.

The cloths $g\ h$ are, as shown in Fig. 3, fed against the movement of the plate, so that the cleaner portions of these cloths will always be upon the front sides of their pads and act upon the plate after the soiled or "fat" portions have acted. I have found it desirable, however, to cause one of the cloths, as $f$, to move in the same direction as the plate, so that its cleaner portion will act upon the plate first. In some cases I have also found it desirable to move several or all of the cloths in the same direction as the plate.

When the cloth $e$ is supplied with whiting, it will of course be used without moisture; but when it is not supplied with whiting it may be moistened, and in some cases it will be found desirable to moisten both the cloths $e$ and $f$. I have therefore shown these cloths provided with fountains 187 188, and squeezing-rolls, similar to those shown in my former patent, by which this moistening may be accomplished. The arrangement which I have found most advantageous is the following: first, one or more dry cloths; next, one or more moistened cloths, and last one or more dry cloths, either with or without polishing material.

Another difficulty experienced in this class of printing has been due to the fact that with stiff ink the wiping-cloths have sometimes failed to thoroughly remove the ink from the raised portions of the plate—a result which it is absolutely necessary to obtain in order to produce good work. To overcome this difficulty I provide one or more of the pads with an extra wiping-cloth, $n$, (see Figs. 37, 38, and 39,) of a coarse open texture, which passes around the pad or pads upon the outside of the usual cloth or cloths. The cloth $n$, by reason of its open texture, will cut and remove the ink from the plate much more readily and thoroughly than would a closely-woven cloth, which, from its comparative smoothness, is liable to slide over the ink without starting it from the plate. If the open cloth $n$ were used alone, the ink would pass through its meshes and soon soil the pad to such an extent as to prevent good wiping; but when used in connection with an ordinary close-woven cloth, as shown, the latter receives the ink which passes through $n$, and so fully protects the pad. The cloth $n$ is led from a cage, 238, similar to the cages 168, which is located in any convenient position, and after passing beneath the pad or pads is rewound upon the cage 169, together with the other cloth. This cloth may be arranged to pass around a single pad, as in Fig. 38, or when used upon a flat press it may pass beneath the several sections of a sectional pad, as shown in Fig. 39. The ordinary cloth in connection with which it is used may be dry, as the cloth $g$, Fig. 38, or it may be moistened, as the cloth $f$, Fig. 37. In many cases it will be found most desirable to use the cloth $n$ in connection with the moistened cloth, as when so used it will absorb a large part of the moisture and prevent undue wetting of the plate.

In my former Letters Patent, before referred to, I have described a method of producing a multicolor print by a single impression from an engraved plate, in which the edges of the bodies of varying colors shall be evenly and perfectly blended into each other. According to the method there set forth, this is accomplished by providing the ink-fountain with a number of partitions by which it is divided into separate compartments corresponding in number to the colors to be used, so that each compartment delivers its particular color to the fountain-roll, thus forming a series of rings of different colors upon the roll. The rings thus formed upon the roll were delivered in the form of stripes to the distributing-table, when the edges of the stripes thus formed were blended into each other by the endwise movement of the distributing-rolls, after which the plate was inked and wiped and the impression taken in the usual manner. I have found, however, that the same result can be accomplished by omitting the blending of the edges of the stripes upon the distributing table or roll and applying the unblended colors directly to the plate, the perfect blending of the colors being accomplished by the pads in the operation of wiping the plate. To accomplish this result, in the present structure the ink-fountain is provided with the proper number of partitions 239, (see Fig. 29,) constructed and arranged, as described in my former Letters Patent, so that the various colors are applied in rings to the fountain-roll. From this roll the colors will be taken by the roll 76, and applied in like rings to the rolls 75 and 79, from which they will be applied in unblended stripes to the plate 52, when, as the plate passes beneath the pads, the edge of the stripes will be blended in an even and perfect manner by the act of wiping. The continuous blending of the colors into one another is prevented in the manner set forth in my former Letters Patent.

Although in the present case the impression-cylinder is shown as provided with but one blanket, and the plate-cylinder with devices for carrying but one plate, it will of course be seen that these cylinders may be supplied with duplicate or even triplicate blankets and plate-holding devices, so as to make two, three, or even more impressions at a single revolution. When these cylinders are made to so operate, the delivery apparatus must of course be modified accordingly, and the plate cylinder must be provided, if whiting is used, with a corresponding number of whiting-carriers and means of operating them. When the plate-cylinder is nearly or quite covered with plates, the apparatus for checking the flow of gas during certain parts of its revolution will of course become unnecessary and may be dispensed with.

As before stated, the wiping-pads may be of either of the constructions shown in my former Letters Patent, before referred to; but I have found a very desirable construction to be that illustrated in Figs. 25 to 28, in which the pad, instead of being composed of some solid but flexible or elastic material, is composed of a rigid backing, 189, to which is attached a flexible sack-like bottom, 190, which can be inflated with any suitable substance, as a liquid or a gas, the advantages of such a construction being that a greater and more permanent degree of elasticity is attained with a very much lighter structure. The sack 190 can be provided at its ends with a suitable nozzle, 191, to which may be attached a pipe, 192, for inflating the sack or for withdrawing the fluid, when desired, the nozzle 191 being of course provided with a suitable stop-cock or other means for closing it after the sack has been inflated. When the sack is inflated with a liquid, it will be found desirable, in order to prevent the liquid from flowing from one end of the pad to the other as it is reciprocated, thereby occasioning greater pressure upon the plate at one end than at the other, to secure to the backing a series of inwardly-extending cross-partitions, 193, said partitions, of course, not extending so near the bottom of the sack as to prevent its yielding slightly when in contact with the plate, and not extending entirely from side to side, so as to prevent the flow of liquid from one end of the sack to the other when the same is being filled.

In Figs. 31 to 36 there is illustrated an inking-in apparatus, which may be used instead of or in addition to the beaters 106, hereinbefore described. This apparatus consists of a series of rubbers, 194, mounted upon a transverse bar, and arranged so that as the plate passes beneath them they receive a rubbing or grinding motion, which acts to drive the ink evenly into all the lines of the engraving. These rubbers are composed of pieces of felt or other textile fabric secured between clamping-plates, in the manner shown in Fig. 34, and are attached to the ends of vertical rods 195, which are secured to the transverse supporting-bar 200, and are provided with spiral springs 196, which serve to hold the rubbers against the plate with a yielding pressure. To give the proper rubbing action the upper ends of the rods 195 are provided with short rock-arms 197, connected with a bar, 198, which receives lateral motion through a pivoted lever, 199, the end of which is loosely connected to one of the reciprocating pads. The motion thus imparted to the rubbers will be a partial rotation with their rods 195, which will cause them to oscillate between the positions illustrated by the diagram in Fig. 35.

In some instances it may be found desirable to cause one of the wiping-cloths—as, for example, $h$—to pass beneath these rubbers, as well as beneath its pad $d$, as illustrated in Fig. 36, in which case the inking-in action of the rubbers will not be exerted directly upon the inked plate, but indirectly through the wiper-cloth. The upper ends of the rods 195, which support the rubber, will be provided with set-screws 201, by which the vertical position of the rubbers with relation the plate can be accurately adjusted.

It is to be understood that the term "wiping-cloth" or "wiper-cloth," as used herein, is intended to comprehend bands of paper, leather, or other material that is suitable for the purpose.

Although only a rotary press is shown in the present case, it is of course to be understood that many of the improvements herein described are equally applicable to flat presses, and may be applied to such presses without departing from the invention.

What I claim is—

1. The combination, with the impression and delivery cylinders and the grippers of the latter, of the gears 137 138, cams 131 136, rock-arms 132 134, and connecting devices, substantially as described.

2. The combination, with the impression and delivery cylinders and the grippers and tapes of the latter, of the gears 137 138, cams 131 136 140, fly 128, and connecting devices, substantially as described.

3. The combination, with the impression-cylinder and the blanket-shaft, of means for moving said shaft longitudinally to adjust the position of the blanket upon the cylinder, all substantially as described.

4. The combination, with the impression-cylinder and its blanket, of the blanket-shaft 14, and means for turning said shaft to tighten the blanket, and for moving said shaft longitudinally to adjust its position upon the cylinder, all substantially as described.

5. The combination, with the impression-cylinder and its blanket, of the pins 211 and the pivoted gripper-cushion 13, arranged to close over said pins and hold the blanket thereon, substantially as described.

6. The combination, with the impression-cylinder and its blanket and one or more wiping-pads, of the plate-cylinder and its laterally-adjustable plate-carrying bed, and means for adjusting the surfaces of said cylinders with relation to each other, all substantially as described.

7. The combination, with the gear 7, of the shaft 10, hub 53, gear-segment 54, worm-gear 55, arm 58, and set-screws 57, substantially as described.

8. The combination, with a plate-carrying bed, as 44, provided with means for securing an engraved plate thereto, of the plate-cylinder provided with front and rear clamping devices, by which beds of different sizes circumferentially of the cylinder can be secured thereto, all substantially as described.

9. The combination, with a bed, as 44, provided with means for securing a plate thereto, of the cylinder 11, provided with a fixed locking-bar, as 46, and a movable locking-bar, as 45, said bars being arranged to act upon the front and rear of the bed, substantially as described.

10. The combination, with a plate-bed, as 44, having means for securing a plate thereto, of the cylinder 11, having slotted flanges 43, a locking-bar, as 45, and means for adjusting and securing said bar at different positions in said slots, all substantially as described.

11. The combination, with the locking-bar 45, of the hubs 48, having extensions, as 49, and gear-segments, worm-gears, as 50, shaft, as 51, and connecting-gears, substantially as described.

12. The combination, with a series of gas-burners secured to the inside of the plate-cylinder in such position as to supply heat continuously to the back of the plate, of a series of burners located outside the cylinder in such position that as the cylinder revolves the face of the plate will be carried in close proximity to the flame, substantially as described.

13. The combination, with the ink-distributing roll 75 and the plate-rolls 79, of means for adjusting said roll 75 both vertically and horizontally, all substantially as described.

14. The combination, with the roll 74, of the fountain 72, attached to the bar 203, having an inclined groove-bar, 205, having rib 204, and screw-rod 206, substantially as described.

15. The combination, with the ink-fountain 72 and fountain-roll 74, of means for adjusting the opposite ends of the fountain and roll to different distances from each other, and separate means for adjusting the whole fountain and roll to different distances from each other, all substantially as described.

16. The combination, with the fountain 72 and roll 74, of the screws 208 and the wedge 205, substantially as described.

17. The combination, with the plate-carrier, its plate, and mechanism for inking the latter, of one or more ink-beaters, as 106, all substantially as described.

18. The combination, with the engraved plate and its carrier, of beaters consisting of yielding rolls provided with means for causing them to strike the plate in rapid succession, all substantially as described.

19. The combination, with the plate-carrier and its plate, of one or more beaters, as 106, and a redistributing-roll, as 123, substantially as described.

20. The combination, with the plate-carrier and plate, of a series of oscillating rubbers, as 194, substantially as described.

21. The combination, with the engraved plate, of a series of oscillating rubbers, consisting of yielding fibrous material which are caused to rub against the plate, substantially as described.

22. The combination, with the reciprocating pad, of a series of rubbers, as 194, and connecting devices whereby the movement of the pad gives an oscillating movement to the rubbers, all substantially as described.

23. The combination, with a spring-seated wiping-pad and a moving wiping-cloth passing around the same, of means for giving to said pad a circular movement, substantially as described.

24. The combination, with two wiping-cloths passing around wiping-pads, of means for imparting to said pads a circular movement in opposite directions, all substantially as described.

25. The combination, with one or more reciprocating wiping-pads having moving wiping-cloths, of one or more circularly moving wiping pads, provided with moving wiping-cloths, all substantially as described.

26. The combination, with one or more circularly-moving spring-seated wiping-pads provided with moving wiping-cloths, of means for varying the throw and speed of said pads, all substantially as described.

27. The combination, with a series of wiping-pads provided with separate and independently-moving wiping-cloths, of means for feeding certain of said cloths against the movement of the plate, and means for feeding other of said cloths with the movement of the plate, all substantially as described.

28. The combination, with a plurality of wiping-pads, of a plurality of wiping-cloths, one of said cloths passing under all of said pads, substantially as described.

29. The combination, with a plate-carrier and plate, of a wiping-pad provided with two wiping-cloths, as $n g$, substantially as described.

30. The combination, with a plate-carrier and plate, of a wiping-pad provided with two wiping cloths, as $n g$, the inner of said cloths being moistened, substantially described.

31. The combination, with a plate-carrier and plate, of a wiping-pad and pad-supporting bar, and means whereby the pad may be adjusted longitudinally of said bar, all substantially as described.

32. The combination, with the vertically-yielding pad-support, of the pad made vertically adjustable with relation to the support, substantially as described.

33. The combination, with the vertically-yielding pad-support, of the pad made adjustable longitudinally with relation to the support, substantially as described.

34. The combination, with the vertically-yielding pad-support, of the pad made vertically and longitudinally adjustable with relation to the support, substantially as described.

35. The combination, with a moving wiping-cloth, of a wiping-pad consisting of a rigid back and an inflated sack-like portion, as 190, provided with means for regulating the pressure of the inflating substance, all substantially as described.

36. In a plate-printing machine, a wiping-pad consisting of a rigid back provided with overlapping projections or partitions, as 193, and an inflated sack-like portion, as 190, all substantially as described.

37. The combination, with a plurality of wiping-cloths and a plurality of winding-cages, as 170, each provided with a pawl-and-ratchet mechanism, of a single reciprocating bar, as 176, for operating all of said cages, all substantially as described.

38. The combination, with the winding-cages and their pawl-and-ratchet mechanism, of the bar 176, provided with inclines 175, and means for adjusting said inclines so as to vary the feed of the different cloths, all substantially as described.

39. The combination, with the bar 176, provided with indices 184, of the inclines 175, provided with pointers 183, and the adjusting-screws 181, substantially as described.

40. The combination, with the series of let-off cages 168, each provided with double star-wheels, as 185, of the double pawls 231, provided with adjustable weights, substantially as described.

41. The combination, with the plate-carrier and engraved plate, of an ink-plate located upon the carrier in advance of the engraving, substantially as described.

42. The combination, with the plate-carrier and the engraved plate, of the lateral ink-plates, substantially as described.

43. The combination, with the plate-carrier and the engraved plate, of the ink-plates 232 233, and means for adjusting them, substantially as described.

44. The combination, with a plate-carrier provided with means for carrying polishing material, of a series of moving wiping pads and cloths, and means for applying said polishing material to one of said cloths, all substantially as described.

45. The combination, with a plate-carrier provided with means for carrying polishing material, of a series of moving wiping pads and cloths, and means for applying moisture to one of said cloths, and said polishing material to another, all substantially as described.

46. A plate-carrier provided with means for supplying polishing material to the wiping-cloth, all substantially as described.

47. The combination, with the plate-cylinder provided with a whiting-carrier, as 163, of the cams 167 and springs 164, substantially as described.

48. The combination, with the plate-cylinder and its movable whiting-carrier, of the spring-seated support 209, substantially as described.

49. The combination, with the whiting-carrier and brick of whiting, of the open-meshed cloth 229, substantially as described.

50. The combination, with the impression-cylinder, of a moistened cloth, as $t$, and means for holding the same against the cylinder, all substantially as described.

51. The combination, with the impression-cylinder, of a moistened cloth, as $t$, and a dry cloth, as $z$, and means for holding said cloths against the cylinder, all substantially as described.

52. The combination, with the impression-cylinder, of a moistened cloth, as $c$, and means for raising said cloth out of contact with the cylinder during a portion of its revolution, all substantially as described.

53. The combination, with the impression-cylinder, of a dry cloth, as $z$, a moistened cloth, as $t$, and means for raising said cloths out of contact with the cylinder during a portion of its revolution, all substantially as described.

54. The improvement in the art of plate-printing, which consists in applying multicolors to the engraved plate in unblended stripes, and then blending the edges of the same in the act of wiping, substantially as described.

In testimony whereof I have hereunto set my hand in the presence of two subscribing witnesses.

HOMER LEE.

Witnesses:
J. A. HOOEY,
T. H. PALMER.